W. S. HARLEY.
SHOCK ABSORBER.
APPLICATION FILED AUG. 24, 1915.
1,216,686. Patented Feb. 20, 1917.
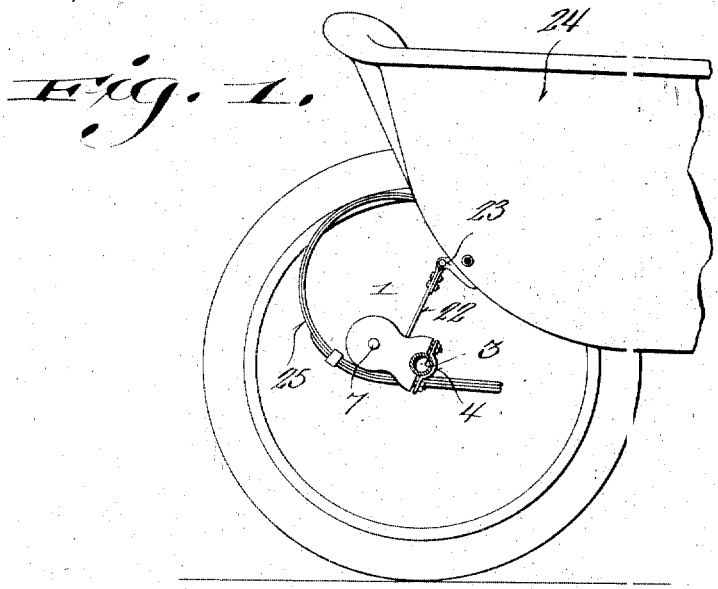
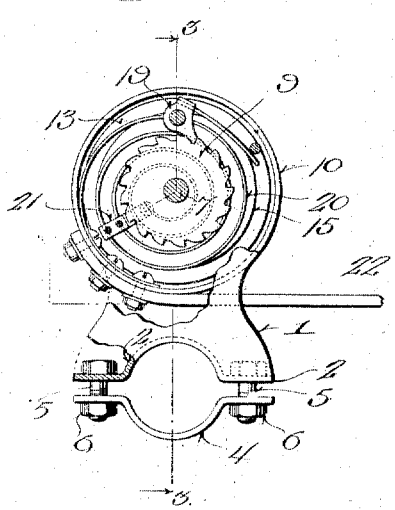
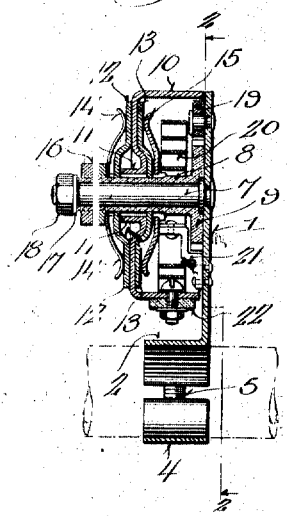

UNITED STATES PATENT OFFICE.

WILLIAM S. HARLEY, OF MILWAUKEE, WISCONSIN, ASSIGNOR TO THE HARLEY-DAVIDSON MOTOR CO., OF MILWAUKEE, WISCONSIN.

SHOCK-ABSORBER.

1,216,686.          Specification of Letters Patent.          Patented Feb. 20, 1917.

Application filed August 24, 1915. Serial No. 47,037.

*To all whom it may concern:*

Be it known that I, WILLIAM S. HARLEY, a citizen of the United States, and resident of Milwaukee, in the county of Milwaukee and State of Wisconsin, have invented certain new and useful Improvements in Shock-Absorbers; and I do hereby declare that the following is a full, clear, and exact description thereof.

This invention relates to the subject of shock-absorbers for motor and other vehicles, and the primary aim of the invention is to produce a shock-absorber that is of such a nature that the same may be readily connected to an axle of the vehicle and the body of the vehicle, respectively, and which will serve to cushion the body against rebounding or other shocks.

The invention contemplates in its general organization a casing that is detachable but firmly connected to the axle of the vehicle and contains novel rotatable parts including a cushioning spring, the rotatable parts having a flexible connection with the body of the vehicle so that re-bounding and other shocks occurring to the axle will not be transmitted to the body.

One simple and thoroughly practical embodiment of the invention is shown in the accompanying drawings wherein—

Figure 1 is a fragmentary rear elevation of a portion of a motor vehicle equipped with the improved shock-absorber, the shock-absorber being shown partly in section.

Fig. 2 is a sectional view of the shock-absorber, taken on the line 2—2, Fig. 3.

Fig. 3 is a sectional view taken on the line 3—3, Fig. 2.

The improved shock-absorber comprises a rear plate 1 having one end portion provided with a laterally projecting concaved flange 2 that is shaped to engage over an axle 3. A similarly shaped clip plate 4 engages beneath the axle, and the end portions of the clip and the flange are detachably connected to embrace the axle 3 by the bolts 5 and nuts 6. The described manner of attaching the shock-absorber to the axle is one that permits the shock-absorber to be quickly attached to, or detached from, the axle, and also permits the shock-absorber to be disposed at any desired angle relative to said axle.

A spindle 7 projects laterally from the plate 1 and has the sleeve 8 of a ratchet wheel 9 loosely mounted thereon, the outer end portion of the sleeve being threaded. An inclosing housing 10 has its hub 11 loosely mounted on the sleeve 8, and frictional braking plates 12 and 13 fast on the sleeve bear on opposite surfaces of the front wall of said housing, said braking plates 12 and 13 being held in engagement with said wall by means of the spring washers 14 and 15, respectively. Clamping and lock nuts 16 are mounted on the threaded portion of the sleeve 8, and a washer 17 and nut 18 are mounted on the outer end of spindle 7 for holding the sleeve 8 thereon. A pawl 19 is pivoted to the plate 1 and prevents reverse movement of the ratchet wheel 9.

A spring 20 is coiled about the sleeve 8 within the housing 10, one end of the spring being fastened to the said housing, the other end of the spring being fastened to the end of an angular bracket 21 that projects into the center convolution of the spring, said bracket being fastened to the plate 1.

A strap or other flexible connector 22 has one end portion fastened to and partly wrapped around the lower exterior portion of the housing 10, said connector extending to and being fastened to a bracket 23 carried by the rear portion of the vehicle body 24.

The usual or any other preferred type of springs 25 connect the body 24 and axle 3.

From the foregoing it will be seen that an upward movement of the body 24 relative to the axle 3 causes connector 22 to rotate housing 10, such rotary movement of the housing winding the spring 20 so that the spring acts in opposition to the upward movement of the body, and that the rotary movement of the housing 10 is opposed by the braking plates 13 and 14. During the upward movement of the body 24, pawl 19 prevents rotary movement of the ratchet 9, and when the spring 20 has checked such upward movement of the body, the expansive force of said spring will cause a reverse movement of the housing 10 and the frictional engagement of the plates 12 and 13 with the outer wall of the housing will rotate sleeve 8, and such movement of the sleeve 8 will rotate ratchet 9.

The braking plates 12 and 13 are important features of this invention, for it will be seen that as said plates are fast on the sleeve 8, and that ratchet 9 is held stationary by the pawl 19 on the forward movement of housing 10, such plates will frictionally engage the housing and serve to retard the movement of the same, thereby compensating for the looseness of the spring 20 when the housing starts on its forward movement.

I claim as my invention:—

1. A shock absorber comprising a plate, means for attaching the plate to an axle of a vehicle, a spindle projecting from the plate, a sleeve loose on the spindle, a housing loose on the sleeve, frictional braking plates fast on the sleeve for retarding rotary movement of the housing in one direction, a spring connection between the housing and the plate and a strap connection between the housing and the body of a vehicle.

2. A shock absorber comprising a plate, means for attaching the plate to a vehicle member, a spindle projecting from the plate, a sleeve loose on the spindle and carrying a ratchet wheel, a housing loose on the sleeve, a pawl carried by the plate and engaging the ratchet wheel, a spring coiled about the sleeve and having its ends connected to the plate and housing, braking means fast on the sleeve and frictionally engaging the housing, and a strap connection between the housing and a vehicle member movable relative to the first vehicle member.

3. A shock absorber comprising a body plate, means for attaching the plate to a vehicle member, a spindle projecting from the plate, a housing including an annular wall portion coacting with the said plate and a side wall portion having a hub journaled on the spindle, friction plates splined on the spindle and engageable with the side wall of the housing, spring washers on the spindle and engaging said friction plates, a spring connecting the body plate and housing and a strap connection between the housing and a second vehicle member movable relative to the first member.

In testimony that I claim the foregoing I have hereunto set my hand at Milwaukee, in the county of Milwaukee and State of Wisconsin, in the presence of two witnesses.

WILLIAM S. HARLEY.

Witnesses:
EDWIN F. CASPER,
CRYSTAL HAYDEL.